United States Patent
Datla

(10) Patent No.: US 7,409,672 B1
(45) Date of Patent: *Aug. 5, 2008

(54) METHOD AND APPARATUS FOR COMMUNICATING INFORMATION BETWEEN A BROWSER AND AN APPLICATION PROGRAM

(75) Inventor: Krishnam R. Datla, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 604 days.

This patent is subject to a terminal disclaimer.

(21) Appl. No.: 10/884,433

(22) Filed: Jul. 1, 2004

Related U.S. Application Data

(63) Continuation of application No. 09/414,984, filed on Oct. 7, 1999, now Pat. No. 6,766,351.

(51) Int. Cl.
*G06F 9/44* (2006.01)
*G06F 3/00* (2006.01)

(52) U.S. Cl. .................. 717/106; 719/328; 719/330; 719/331

(58) Field of Classification Search .................. None
See application file for complete search history.

(56) References Cited

U.S. PATENT DOCUMENTS

| | | | |
|---|---|---|---|
| 5,754,772 A | 5/1998 | Leaf | |
| 5,761,673 A | 6/1998 | Bookman et al. | |
| 5,781,739 A | 7/1998 | Bach et al. | |
| 5,995,756 A | 11/1999 | Hermann | |
| 6,101,510 A * | 8/2000 | Stone et al. | 715/513 |
| 6,101,528 A * | 8/2000 | Butt | 709/203 |
| 6,112,228 A * | 8/2000 | Earl et al. | 709/205 |
| 6,119,166 A | 9/2000 | Bergman et al. | |
| 6,323,881 B1 | 11/2001 | Broulik et al. | |
| 6,339,783 B1 | 1/2002 | Horikiri | |

(Continued)

FOREIGN PATENT DOCUMENTS

WO  WO 99/27460 A1  6/1999

OTHER PUBLICATIONS

Jason Hunter and William Crawford, "Java Servlet Programming", O'Reilly, Nov. 1998.*

(Continued)

*Primary Examiner*—Mary Steelman
(74) *Attorney, Agent, or Firm*—Hickman Palermo Truong & Becker LLP

(57) ABSTRACT

A method and apparatus are provided for communicating information and carrying out other interactions between a browser and an application program. A hyperaction protocol is defined that enables a browser to directly call functions of an application program executed by a separate server over a public network. In one embodiment, in the course of parsing and displaying an HTML document or other HTML source text, a browser encounters or receives a hyperaction request of the form "hyperaction://<ApplicationAction>#<Payload>." In response, the browser identifies a function or other action of a separate application. The browser calls that function of the application over the network and provides the payload. When a response is received, the browser extracts data values or function results provided by the application. As a result, a browser can directly interact with an application without using scripts or other awkward mechanisms of existing protocols.

32 Claims, 6 Drawing Sheets

U.S. PATENT DOCUMENTS

| | | |
|---|---|---|
| 6,480,882 B1 | 11/2002 | McAdam et al. |
| 6,549,952 B1 | 4/2003 | Plassmann et al. |
| 6,615,240 B1 | 9/2003 | Sullivan et al. |
| 6,643,708 B1 | 11/2003 | Francis et al. |

OTHER PUBLICATIONS

CGI Specification, hoohoo.ncsa.uiuc.edu/cgi/interface.html, pp. 1-24 (Oct. 1995).

Esposito, D., Pluggable Protocols, Microsoft Internet Developer, www.microsoft.com/mind/0199/cutting/cutting0199.asp, pp. 1-11 (text as printed) and pp. 1-5 (figures as printed), (Jan. 1999).

HyperActions in a Markup Language, IBM Technical Disclosure Bulletin, vol. 39, No. 1, pp. 429-430 (Jan. 1996).

JRun Users Manual, version 2.3, Live Software, Inc., www.servlets.net/support/downloads/JRunUsersGuide.pdf, pp. 1-59 (Apr. 1999).

Voss, G., JavaServer Technologies, Part II, java.sun.com/developer/technicalArticles/Servlets/JavaServerTech2/index.html, pp. 1-20 (May 1997).

\* cited by examiner

METHOD AND APPARATUS FOR COMMUNICATING INFORMATION BETWEEN A BROWSER AND AN APPLICATION PROGRAM

RELATED APPLICATIONS

This application a continuation of U.S. patent application Ser. No. 09/414,984, entitled, "METHOD AND APPARATUS FOR COMMUNICATING INFORMATION BETWEEN A BROWSER AND AN APPLICATION PROGRAM", filed Oct. 7, 1999 now U.S. Pat. No. 6,766,351, the entire contents of which are hereby incorporated by reference.

FIELD OF THE INVENTION

The present invention relates to data processing. The invention relates more specifically to methods and apparatus for communicating information and carrying out other interactions between a browser and an application program.

BACKGROUND OF THE INVENTION

Specialized computer programs called browsers are now widely used in networked computer systems for the purpose of retrieving and interacting with information stored in servers. A browser is a computer program specifically designed to help users view and navigate hypertext, on-line documentation, or a database. The term "browser" most often refers to a computer program designed to permit a user to view and interact with hypertext information, such as pages and programs written in the Hypertext Markup Language (HTML) that is communicated using the Hypertext Transfer Protocol (HTTP).

FIG. 1 is a block diagram showing a client-server system, in which client 100 communicates over a network 104 with server 106. Client 100 executes a browser 102. Server 106 executes application 108, which has access to one or more stored electronic documents 110.

In this configuration, browser 102 may establish a connection through network 104 to application 108. For example, browser 102 opens an HTTP connection through network 104 to an HTTP server running on server 106, or an HTTP daemon of application 108. Under control of client 100, browser 102 issues a request that specifies one or more of the documents 110 using a document identifier, such as a Universal Resource Locator (URL). Server 106 receives the request, parses it, retrieves the specified document from among documents 110, and sends a copy of the document in a response to browser 102. Browser 102 receives the document, parses coded instructions within the document, e.g., HTML source code, and displays the contents of the document at client 100 according to the coded instructions contained in the document.

Browsers can be configured as stand-alone computer programs or as processes that can be called from within another application program. Examples of stand-alone browsers are NCSA Mosaic, Netscape Communicator®, and Microsoft Internet Explorer®. Netscape Communicator and Microsoft Internet Explorer also are available in the form of executables that can be called from within an application program.

Browsers also have numerous graphical user interface display capabilities, communications functions, and security functions. For example, the HTML 3.0 standard defines various graphical user interface elements ("widgets") that a browser can automatically create and display when an HTML source document contains a particular type of command. However, there is presently no way for a separate application program, at the client or at a separate server, to selectively invoke such capabilities and functions without sending an HTML document to the browser for standard processing. There is a need for a mechanism whereby an application can invoke a particular function of the browser, and the browser can obtain data values from the application that are needed for proper or successful execution of the function that is invoked.

In conventional approaches, a browser is invoked from within an application program in order to load a page based on a standard protocol such as HTTP, file transfer protocol (FTP), etc. In the current approach, the application can pass output to the browser only by creating and passing a URL to the browser that defines a particular static page on a particular server, or a script and parameters for use by the script. An HTTP server or an application that is addressed by the browser then generates an output page and instructs the browser to load it. However, this approach has many disadvantages and drawbacks.

For example, HTTP and FTP are cumbersome to use for certain kinds of interactions between an application and a browser. CGI scripts or other mechanisms have to be used in order to request application functions and pass variable values or references using HTTP. The lists of parameters and values that appear in the scripts are complicated and must be carefully constructed and concatenated to assure proper operation.

The HTTP approaches require, to at least some extent, the HTTP protocol to carry out functions for which it was not designed. The scripts and other parameter passing mechanisms are grafted onto HTTP and are functional, but they are not elegant and have definite limitations. There is a need for a new protocol or an improved protocol that is intended for and designed from the ground up to handle communications between a browser and an application or server.

Moreover, using the traditional protocols, the browser cannot easily obtain information that it may need from the application while the application is running. There is no convenient way to obtain, for example, the value of a single variable that is maintained by a Web application.

Based on the foregoing, there is a clear need in this field for a mechanism that enables a browser to directly access functions and data that are maintained by an application executed remotely or separately from the browser.

Other needs and objects will become apparent from the following description.

SUMMARY OF THE INVENTION

The foregoing needs and objects, and other needs and objects that will become apparent from the following description, are achieved by the present invention, which comprises, in one aspect, a method for communicating information and carrying out other interactions between a browser and an application program. A hyperaction protocol is defined that enables a browser to directly call functions of an application program executed by a separate server over a public network. In one embodiment, in the course of parsing and displaying an HTML document or other HTML source text, a browser encounters or receives a hyperaction request of the form "hyperaction://<ApplicationAction>#<Payload>." In response, the browser identifies a function or other action of a separate application. The browser calls that function of the application over the network and provides the payload. When a response is received, the browser extracts data values or function results provided by the application. As a result, a browser can directly interact with an application without using scripts or other awkward mechanisms of existing protocols.

In a specific embodiment, the invention encompasses a method of causing an application program to carry out function thereof upon request by a separate client, comprising the computer-implemented steps of receiving, at the client, a request to invoke a program action that is identified in the request; determining the function of the application program to invoke based on the program action identified in the request; communicating a message to the application program that requests the application program to carry out the function; receiving result information from the application program as a result of the application program carrying out the requested function; using the result information at the client.

One feature of this aspect is that the step of determining comprises the steps of mapping an identifier of the action in the request to a name of the action that is used by the application program. Another feature is that the step of receiving a request involves identifying, at the browser, a request to carry out the function of the application program, wherein the request substantially conforms to the format "hyperaction:// <Application Action>#<Payload>, wherein "hyperaction" identifies a hyperaction protocol, "Application Action" identifies the function of the application program, and "Payload" comprises one or more data identifiers that specify data for use by the application program in carrying out the function.

According to another feature, receiving a request involves identifying, in a portion of HTML source code that is received at the browser for interpretation and display, a request to carry out the function of the application. Yet another feature is that the step of determining comprises mapping the program action that is identified to the request to the function by looking up the program action in an action list that is stored at the client in association with the browser. Still another feature involves receiving function information that describes available functions of the application program and registering the function information in association with one or more function identifiers in an action list that is stored at the client in association with the browser. In another feature, the program function is selected from one of a plurality of available hyperaction functions that are defined within the application program.

The invention also encompasses an apparatus, computer-readable medium, and carrier wave communicated over a network, which are configured as set forth above and with other features and alternatives.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF AN EMBODIMENT

A method and apparatus for communicating information and carrying out other interactions between a browser and an application program is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

A preferred embodiment has three aspects. First, a protocol called "hyperaction" is defined. A browser is provided with a mechanism for parsing and acting on resource identifiers that identify actions in the hyperaction protocol.

Second, a registration phase is defined. In the registration phase, an application program registers itself with the browser and identifies hyperactions that the application program can carry out. Each hyperaction is associated with a function of the application program that can respond to the browser and provide data to it.

Third, a runtime phase is defined. In the runtime phase, the application program may invoke the browser and pass it a URL that specifies the hyperaction protocol and one of the hyperactions. When the browser parses the URL and determines that it contains a hyperaction protocol element, the browser sends a message back to the application program to obtain information from the application for display to the user. The application responds by providing one or more HTML files to the browser. The browser parses and displays the HTML files.

Alternatively, in the runtime phase, the browser sends a hyperaction request to the application program that identifies a particular function of the application program that the browser wants to use. The hyperaction request includes a payload containing one or more parameter values that are needed by the application program to successfully or properly carry out the requested function. The application responds by carrying out the requested function using the values that are provided.

Accordingly, interactions between the browser and the application program are greatly simplified. The application can use all graphical rendering capabilities of the browser to display various data to the user. The application can receive input from the user through the browser.

Example Structure of an Embodiment

Figure 1:
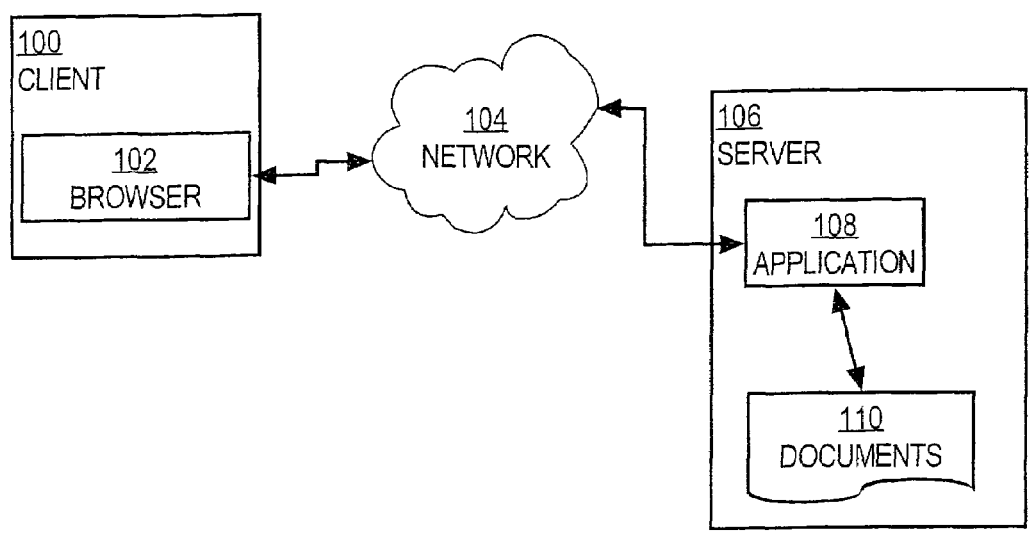
FIG. 1 is a block diagram of a client-server system.
Figure 2A:
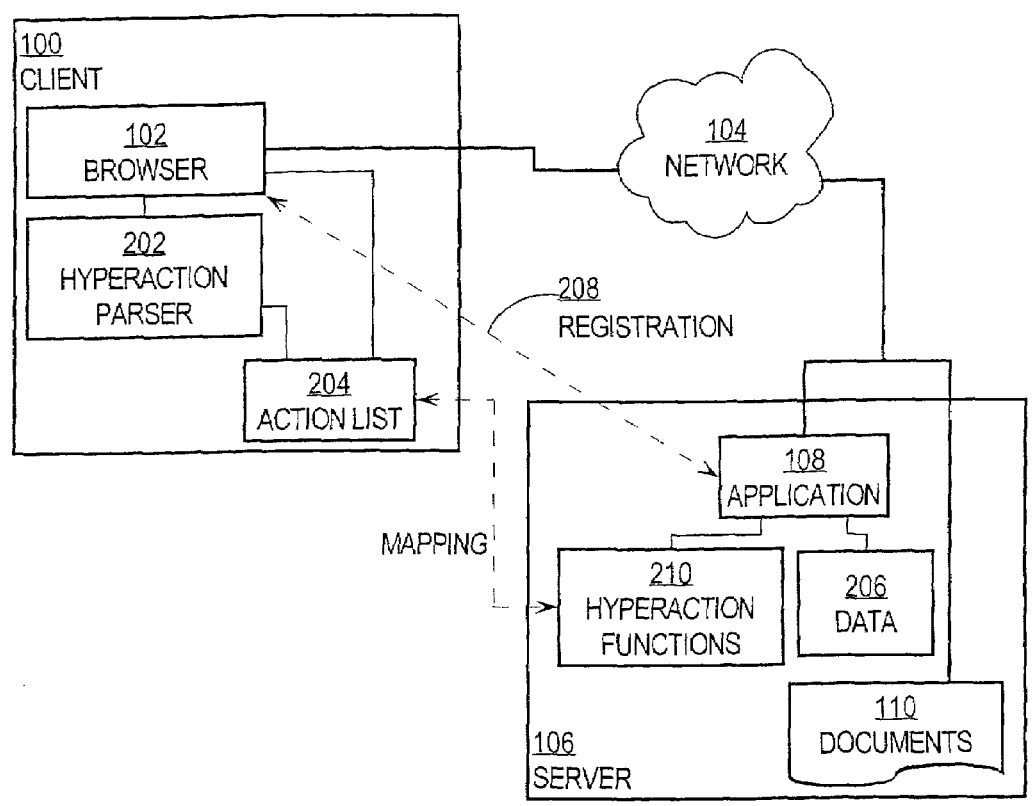
FIG. 2A is a block diagram of a browser system having improved interaction between a browser and an application program.

FIG. 2A is a block diagram of a browser system having improved interaction between a browser and an application program.

In the exemplary embodiment of FIG. 2A, client 100 communicates with server 106 through network 104. Alternatively, client 100 may be directly coupled to server 106. Client 100 is any network node, such as end station device, including a workstation, personal computer, personal digital assistant, etc. Network 104 is any communication network, or internetwork, including a LAN, WAN, the global packet-switched network known as the Internet, etc. Server 106 is any computing device that can execute application programs and communicate information over a network to a client, such as a workstation, server computer, mainframe, etc.

Browser 102 is coupled to a hyperaction parser 202 that can parse commands and messages sent to the browser that are formatted in a hyperaction protocol. Hyperaction parser 202 also can recognize and respond to hyperaction requests that are embedded in HTML pages or HTML output that is received by the browser from a separate server or application. In one embodiment, hyperaction parser 202 is a plug-in to browser 102. Alternatively, hyperaction parser 202 is integrated into browser 102.

Application 108 is coupled to or includes one or more hyperaction functions 210, and may be coupled to data 206. The hyperaction functions 210 are one or more functions that can be called by browser 102 in response to receiving a hyperaction protocol message. For example, hyperaction functions can be standard subroutines or functions within application 108, or in an external library, or in another process that is associated with application 108. Data 206 may be any stored data that is useful to application 108, including a data file, a table of numeric values, a relational database, an individual value of a particular variable or constant that is maintained by the application, or any other stored information structure.

A command or message formatted in the hyperaction protocol comprises a hyperaction protocol identifier, an application action identifier, and a payload. The hyperaction protocol identifier indicates that the command or message is in the hyperaction protocol. The application action identifier specifies one among several actions that can be carried out by application 108. Such actions also may be called "hyperactions." The payload carries one or more values that can be used by an application action, for example, to specify parameters, numeric values, strings, etc. In the preferred embodiment, a command in the hyperaction protocol has the form:

hyperaction://<ApplicationAction>#<Payload> wherein "hyperaction://" is the hyperaction protocol identifier. "<ApplicationAction>" is an application action identifier ("hyperaction") and is associated, through a mapping described later, with the name of a function of application 108, or an identifier of one of the documents 110. "<Payload>" is a numeric value, string value, a name of a variable, or a reference to a variable that is to be used by, passed to, or obtained from the application function. The character "#" is a separator and is not used in an application action identifier or payload.

The term "hyperaction" has been selected arbitrarily as a means of identifying a protocol that naturally supports data communications and function calls among a browser and an application or server. The specific term "hyperaction" is not required by embodiments of the invention, and any other suitable label that is understood by both the browser and the application may be used.

Notably, the hyperaction protocol is not defined in any version of the HTML standard or any tag thereof. Thus, a standard browser has no inherent mechanism to execute hyperaction requests. Also, a hyperaction request as defined herein is a request to execute a function of a browser through means other than HTML tags or other than using standard HTML operations.

The protocol defined herein is intended to be two-way. Thus, an application action identifier may specify a function of the application that is to receive data, and the payload may contain one or more data values that are obtained from a client or user by the browser using its input/output functions. Further, an application action may also specify a function of the browser that the application program desires to invoke, and the payload may contain values that the browser needs to carry out the function invocation. For example, the application program may wish to carry out display functions or user interface functions of the browser. Such functions can be specified by name or other symbolic identifier in a hyperaction request.

Hyperaction parser 202 can receive a command or message that is formatted according to the hyperaction protocol and identify its constituent elements. Preferably, hyperaction parser 202 scans a command or message created by or using the browser. The command or message may be a string entered into the browser's data entry field by a user, or a string generated by the browser or an applet that runs in the browser. The hyperaction parser 202 determines whether the message contains a hyperaction request. If so, the hyperaction parser 202 maps the application action in the hyperaction request to a particular function of application 108, and opens a hyperaction connection to the application. Hyperaction parser 202 then passes a message, which contains the application action and payload, over the connection to application 108.

An action list 204 is coupled to hyperaction parser and to browser 102. Action list 204 stores a mapping of application actions to hyperaction functions 210. Using action list 204, browser 102 or hyperaction parser 202 can match an application action of a hyperaction request to a particular function call or electronic document of application 108 or in hyperaction functions 210. Action list 204 is created when application 108 initializes, or alternatively when server 106 initializes. At such initialization time, application 108 registers itself with browser 102, as indicated by registration path 208, and provides a list of application actions and corresponding hyperaction functions. In response, browser 102 or hyperaction parser 202 creates and stores action list 204.

Figure 2B:
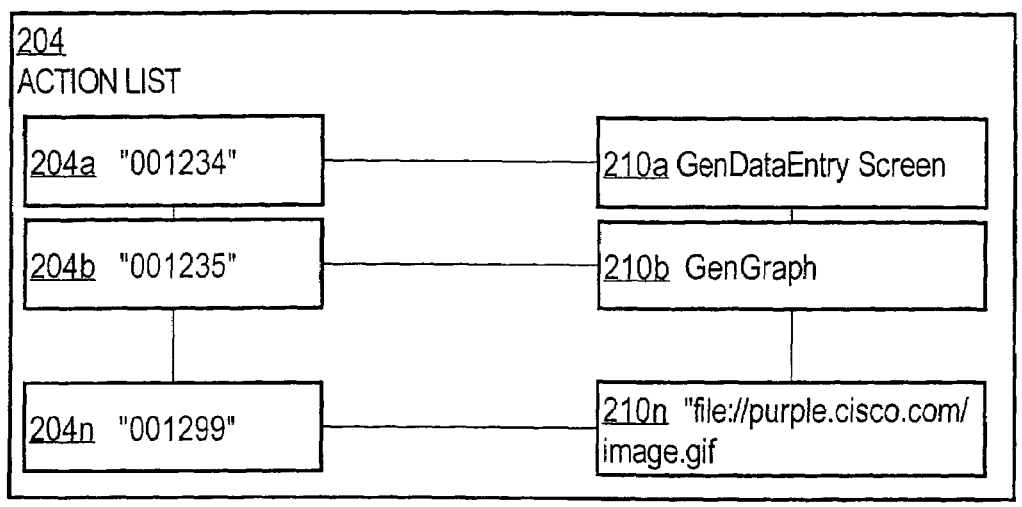
FIG. 2B is a block diagram showing a mapping of hyperactions to corresponding application functions.

FIG. 2B is a block diagram showing a mapping of hyperactions to corresponding application functions. Action list 204 may have the structure shown in FIG. 2B. A plurality of hyperaction identifiers 204a-204n are stored in association with corresponding application function identifiers 210a-210n. Action list 204 may be stored in the form of a database table, sequential or random access data file, array, linked list, etc. The particular information structure used for action list 204 is not important provided that there is some kind of mapping of application action identifiers to application functions.

Hyperaction identifiers 204a-204n may comprise numeric values, string identifiers, coded values, etc., such as "Draw," "InterestRateCalculator," "Action 942," etc. The specific form of information that is stored is not critical. What is important is that action list 204 has a unique label for each discrete action that a browser can request an application to carry out.

Application function identifiers 210a-210n each comprise a label that is meaningful in the context of application 108. For example, application function identifiers 210a-210n may be names of functions or subroutines in the source code of application 108, or names of objects, or coded labels that refer to internal functions of application 108. The specific format of application function identifiers 210a-210n is not critical. Each application function identifier should clearly and uniquely refer to a function of application 108 that can provide service to a browser.

In FIG. 2A, for purposes of illustrating an exemplary embodiment, the elements of client 100 and server 106 are shown logically separated by network 104. However, alternatively, all the elements of client 100 may be co-located with or executed by the same computing device as server 106 and its elements. There is no requirement to use two separate physical machines or to have the elements logically separated by an intervening network.

Operation of an Embodiment

Figure 3A:
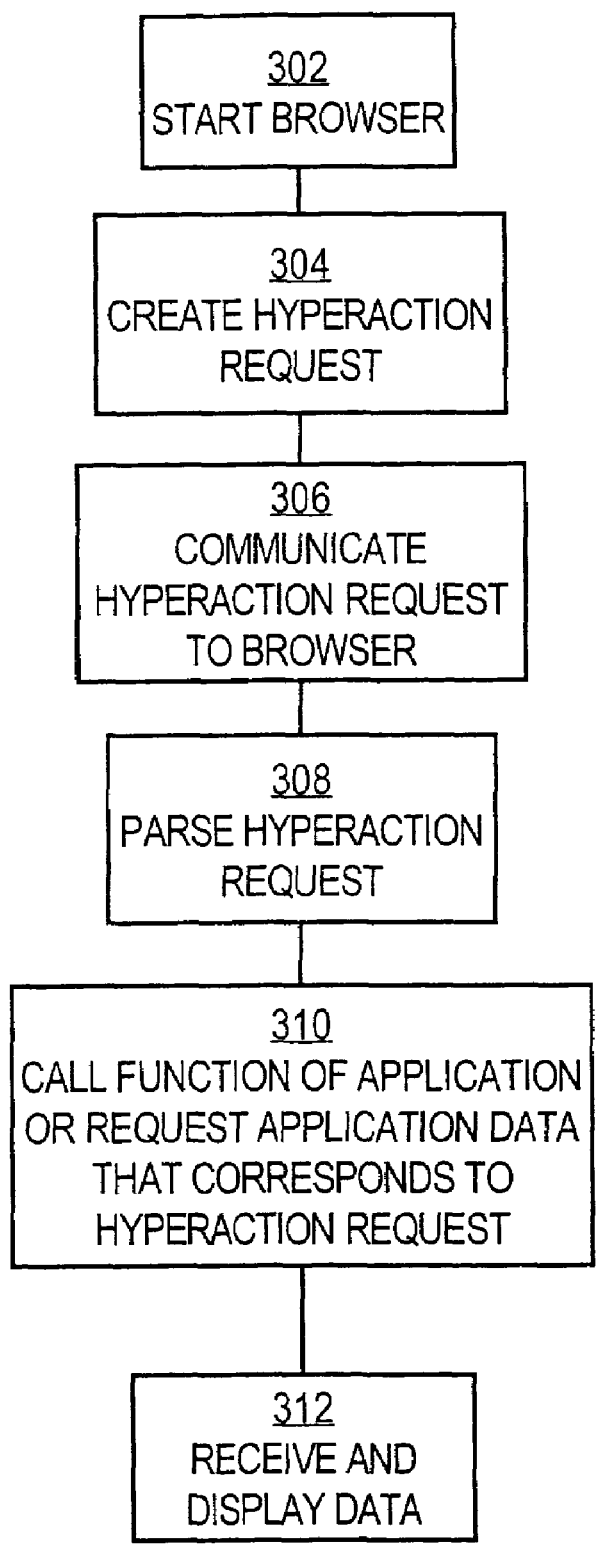
FIG. 3A is a flow diagram of a method of using the system of FIG. 2A, FIG. 2B.

FIG. 3A is a flow diagram of one embodiment of a method of using the system of FIG. 2A, FIG. 2B.

As shown by block 302, a browser is started. Block 302 may involve invoking a browser on the client from within an application. For example, a client element of application 108, located at and executed by client 100, may call a dynamically linked library associated with browser 102. Any other suitable application invocation mechanism may be used.

A hyperaction request is created, as shown by block 304. For example, block 304 may involve creating and storing a URL in the form of the hyperaction protocol described above in connection with FIG. 2A. The hyperaction request may be created manually by a user who types a URL into the URL data entry field of the browser. Alternatively, the hyperaction request may be generated by a client-side application or applet executing within or in association with the browser, and passed to the browser using an appropriate function call. In still another alternative, the hyperaction request is identified by the browser as it is parsing and attempting to display HTML source text that has been received as part of a static HTML page or dynamic HTML output from server 106 or from application 108.

In block 306, the hyperaction request is communicated to the browser. Block 306 may involve calling a function of the browser that is conventionally used to load Web pages identified by URLs, and providing the hyperaction request as a parameter.

In block 308, the hyperaction request is parsed. Block 308 may involve passing the hyperaction request to hyperaction parser 202 of browser 102. Hyperaction parser 202 scans the hyperaction request and separates the request into its constituent elements. This may include creating and storing values that correspond to the application action and payload. It may also include mapping a hyperaction that is named in the hyperaction request to a specific application function identifier using action list 204.

In block 310, the hyperaction is carried out. For example, a function of application 108 among hyperaction functions 210 is called based on the value of the application action parameter of the hyperaction request, and the payload that is passed in the function call. As another example, the payload is null, and the hyperaction request identifies a data value in data 206 that the application retrieves and passes back to the browser in a responsive message. An example of a suitable responsive message is an HTTP response message.

In still another alternative, the application action may indicate that the browser should invoke a static page or script that is identified in the payload. In that case, the browser creates and stores a URL that contains the request specified in the payload and invokes its own page load function in order to retrieve the static page or invoke the script.

The particular mechanism of implementing this functionality is not critical. What is important is that the browser determines what function of the application it should invoke, and then invokes that function of the application.

In block 312, the browser receives information from the application and uses it. Block 312 may involve displaying a user interface for the application using browser graphical user interface elements or similar capabilities. It may involve using a data value received from the application in one or more subsequent computations or processes. Any appropriate action may be taken by the browser upon receipt of the application information.

Figure 3B:
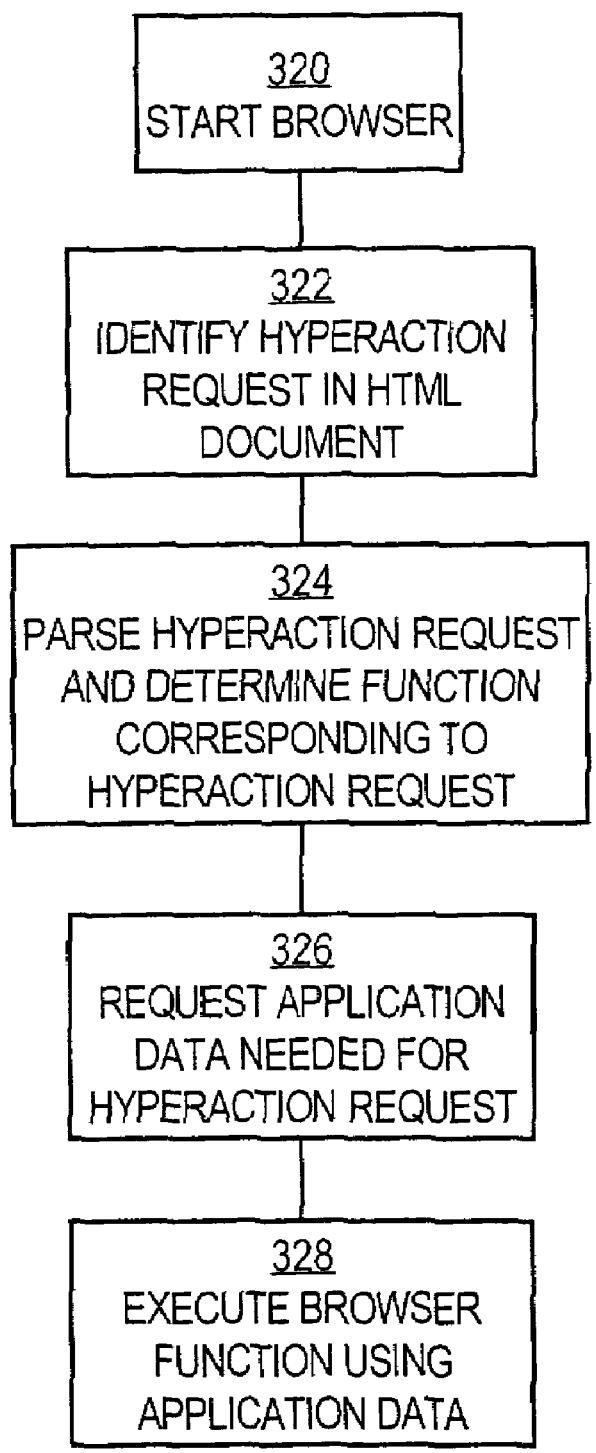
FIG. 3B is a flow diagram of an alternate method of using the system of FIG. 2A, FIG. 2B.

FIG. 3B is a block diagram of an alternative embodiment of a method of using the system of FIG. 2A, FIG. 2B.

As shown by block 320, a browser is started. Block 320 may involve invoking a browser from within an application. For example, a client element of application 108, located at and executed by client 100, may call a dynamically linked library associated with browser 102. Any other suitable application invocation mechanism may be used.

In block 322, a hyperaction request is identified. Block 322 may involve identifying a hyperaction request using the browser as the browser is parsing and attempting to display HTML source text that has been received as part of a static HTML page or dynamic HTML output from server 106 or from application 108. In a particular embodiment, block 322 involves scanning HTML source text and identifying a string tagged with the hyperaction identifier "hyperaction://."

In block 324, the hyperaction request is parsed in order to determine which browser function corresponds to the hyperaction request. Block 324 may involve mapping an action identifier in the hyperaction request to a list of action identifiers and corresponding browser actions. For example, block 324 may involve determining that in the hyperaction request
   hyperaction://PullDownList#AppListChoices
the action identifier "PullDownList" corresponds to a browser function that displays a pull-down list in the user interface window generated by the browser.

In block 326, application data that is needed to carry out the hyperaction request is obtained. For example, the browser connects to application 108 and requests one or more data values that are needed for the identified browser action. In the hyperaction example given above, the browser would contact application 108 and obtain a value for the variable "AppListChoices." The value of the variable could be, for example, a list of labels to display in the pull-down list that is generated by the PullDownList browser action.

In block 328, the browser function is executed using the data that has been obtained from the application. As an example, the browser executes its PullDownList function and uses the value of "AppListChoices" to determine what to display in a pull-down menu.

As a result, using the foregoing process, a browser may obtain data values and call functions of an application program directly, using a hyperaction request. Cumbersome scripts and related programs are not required. This technique simplifies programmatic interaction among a browser and a separate application program or server. The application may use all graphical rendering capabilities of the browser to display information to the user. Also, the application can receive input from the user through the browser.

Hardware Overview

Figure 4:
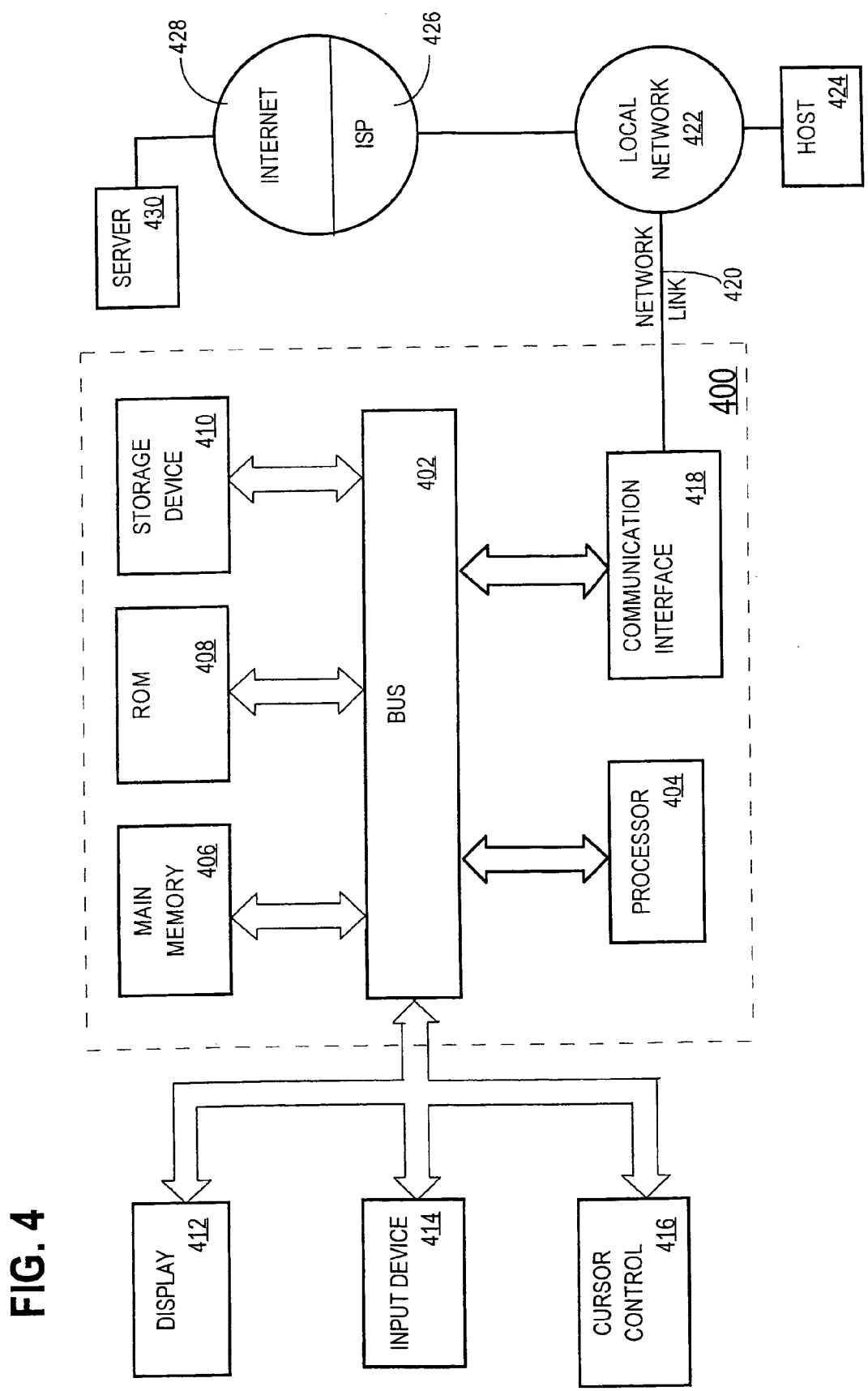
FIG. 4 is a block diagram of a computer system that may be used to implement an embodiment.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for communicating information and carrying out other interactions between a browser and an application program. According to one embodiment of the invention, communicating information and carrying out other interactions between a browser and an application program is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for communicating information and carrying out other interactions between a browser and an application program as described herein.

The received code may be executed by processor 404 as it is received, and/or stored in storage device 410, or other non-volatile storage for later execution. In this manner, computer system 400 may obtain application code in the form of a carrier wave.

Scope

In this disclosure, including in the claims, certain process steps are set forth in a particular order, and alphabetic and alphanumeric labels may be used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of activating a function of a browser, comprising the computer-implemented steps of:
    receiving, at the browser, a request from a separate application program to invoke the function of the browser, wherein receiving the request comprises:
        receiving, at the browser, the request from the separate application program to invoke the function of the browser, wherein the request conforms to the format "hyperaction://<Application Action>#<Payload>"
        wherein "hyperaction" identifies a hyperaction protocol, "Application Action" identifies the function of the browser, and "Payload" comprises one or more data identifiers that specify data for use by the browser in carrying out the function;
    requesting the application program to provide one or more values needed to carry out the requested function;
    receiving one or more values from the application program; and
    executing the function using the received values;
    wherein all preceding steps are performed at the browser.

2. A method as recited in claim 1, wherein receiving the request comprises receiving the request at the browser that comprises a function identifier and one or more data identifiers that specify data for use by the browser in carrying out the function.

3. A method as recited in claim 1, wherein receiving the request comprises receiving the request at the browser that comprises information identifying the browser function to carry out and which is formatted according to a protocol not supported by an HTML standard.

4. A method as recited in claim 1, further comprising the step of mapping a function identifier in the request to a name of the function of the browser.

5. A method as recited in claim 1, wherein the step of receiving the request comprises the step of identifying, in a portion of HTML source code that is received at the browser for interpretation and display, the request to carry out the function of the separate application program.

6. A method as recited in claim 1, further comprising mapping a program action that is identified in the request to the function by looking up the program action in an action list that is stored at a client in association with the browser.

7. A method as recited in claim 1, further comprising the steps of:
    receiving function information that describes available functions of the application program;
    registering the function information in association with one or more function identifiers in an action list that is stored at a client in association with the browser.

8. A method as recited in claim 1, wherein the function is selected from one of a plurality of available hyperaction functions that are defined within the browser.

9. A method as recited in claim 1, wherein:
    the request from the separate application program to invoke the function of the browser comprises a protocol identifier associated with a browser-application communication protocol, a function identifier associated with the function of the browser, and one or more data identifiers that specify data for use by the browser in carrying out the function;
    requesting the application program to provide the one or more values comprises sending a message from the browser to the application program that is formatted according to the browser-application communication protocol and that requests the application program to provide then-current values associated with the data identifiers;
    receiving the one or more values comprises receiving the then-current values from the application program; and
    executing the function comprises executing the function of the browser using the then-current values.

10. A method as recited in claim 9, further comprising the steps of identifying the request in the browser-application communication protocol within an HTML document that is received by the browser.

11. A method as recited in claim 10, further comprising the steps of identifying the request by scanning the HTML document to identify a hyperaction identifier of the form "hyperaction://" in the HTML document.

12. The method of claim 1, wherein the separate application program is at a client.

13. The method of claim 1, wherein the separate application program is at a server.

14. The method of claim 1, wherein the browser resides within a client.

15. The method of claim 1, wherein the browser function is invoked without sending an HTML document to the browser.

16. A computer-readable storage medium storing one or more sequences of instructions for activating a function of a browser, wherein execution of the one or more sequences of instructions by one or more processors causes the one or more processors to perform the steps of:
    receiving, at the browser, a request from a separate application program to invoke the function of the browser, wherein receiving the request comprises:
        receiving, at the browser, the request from the separate application program to invoke the function of the browser, wherein the request conforms to the format "hyperaction://<Application Action>#<Payload>"
        wherein "hyperaction" identifies a hyperaction protocol, "Application Action" identifies the function of the browser, and "Payload" comprises one or more data identifiers that specify data for use by the browser in carrying out the function;
    requesting the application program to provide one or more values needed to carry out the requested function;
    receiving one or more values from the application program; and
    executing the function using the received values;
    wherein all preceding steps are performed at the browser.

17. A computer-readable storage medium as recited in claim 16, wherein the request received at the browser comprises a function identifier and one or more data identifiers that specify data for use by the browser in carrying out the function.

18. A computer-readable storage medium as recited in claim 16, wherein the request received at the browser comprises information identifying the browser function to carry out, wherein the information is formatted according to a protocol not supported by an HTML standard.

19. A computer-readable storage medium as recited in claim 16, wherein the one or more sequences of instructions further comprise instructions the execution of which by the one or more processors causes the one or more processors to perform the steps of:
    receiving function information that describes available functions of the application program;
    registering the function information in association with one or more function identifiers in an action list that is stored at a client in association with the browser.

20. A computer-readable storage medium as recited in claim 16, wherein:
the request from the separate application program to invoke the function of the browser comprises a protocol identifier associated with a browser-application communication protocol, a function identifier associated with the function of the browser, and one or more data identifiers that specify data for use by the browser in carrying out the function;
the instructions that cause the one or more processors to perform the step of requesting the application program to provide the one or more values comprise instructions the execution of which by the one or more processors causes the one or more processors to perform the step of sending a message from the browser to the application program that is formatted according to the browser-application communication protocol and that requests the application program to provide then-current values associated with the data identifiers;
the instructions that cause the one or more processors to perform the step of receiving the one or more values comprise instructions the execution of which by the one or more processors causes the one or more processors to perform the step of receiving the then-current values from the application program; and
the instructions that cause the one or more processors to perform the step of executing the function comprise instructions the execution of which by the one or more processors causes the one or more processors to perform the step of executing the function of the browser using the then-current values.

21. A computer-readable storage medium as recited in claim 16, wherein the separate application program is at a server.

22. A computer-readable storage medium as recited in claim 16, wherein the browser function is invoked without sending an HTML document to the browser.

23. A method of an application program carrying out a function thereof upon request by a separate client, comprising the computer-implemented steps of:
receiving, at the application program, a message including a request from a separate client to invoke a program action by the application program, the program action being identified in the request;
wherein the request included in the message conforms to the format "hyperaction://<Application Action>#<Payload>"
wherein "hyperaction" identifies a hyperaction protocol, "Application Action" identifies the function of the application program, and "Payload" comprises one or more data identifiers that specify data for use by the application program in carrying out the function;
wherein the function of the application program to invoke is based on the program action identified in the request and is determined at the separate client;
wherein the request in the message requests the application program to carry out the function using a label for the function that is meaningful to the application program;
sending result information from the application program to the separate client as a result of the application program carrying out the requested function;
wherein the result information is for use at the separate client.

24. A method as recited in claim 23, further comprising:
sending function information from the application program to the separate client that describes available functions of the application program;
wherein the sending is for registering the function information in association with one or more function identifiers in an action list that is stored at the client in association with a browser; and
determining the function of the application program to invoke based on the program action identified in the request.

25. A method as recited in claim 23, wherein the program function is selected from one of a plurality of available hyperaction functions that are defined within the application program.

26. A method of causing an application program to carry out a function thereof upon request by a separate client, comprising the computer-implemented steps of:
sending, to the separate client, a request to invoke a program action, the program action being identified in the request, wherein the step of sending the request includes at least the step of
sending information to a browser at the separate client, sufficient to identify the request to carry out the function of the application program, wherein the request conforms to the format
"hyperaction://<Application Action>#<Payload>"
wherein "hyperaction" identifies a hyperaction protocol, "Application Action" identifies the function of the application program, and "Payload" comprises one or more data identifiers that specify data for use by the application program in carrying out the function;
receiving, at the application program, a message including the request from the separate client to invoke a program action by the application program, the program action being identified in the request;
wherein the function of the application program to invoke is based on the program action identified in the request, and determined at the separate client;
wherein the request in the message requests the application program to carry out the function using a label for the function of the application program;
wherein the function of the application program to invoke is determinable by the separate client based on the program action identified in the request;
sending result information from the application program to the separate client as a result of the application program carrying out the requested function;
wherein the result information is for use at the separate client.

27. A method as recited in claim 26, wherein the sending is performed by the application program.

28. A method as recited in claim 26, further comprising the application program sending a message to the separate client, including a portion of HTML source code that is for receipt by the browser and for interpretation and display, and that identifies the request to carry out the function of the application program.

29. A computer-readable storage medium storing one or more sequences of instructions for causing an application program to carry out a function thereof upon request by a separate client, wherein execution of the one or more sequences of instructions by one or more processors causes the one or more processors to perform the steps of:
receiving, at the application program, a message including a request from the separate client to invoke a program action by the application program, the program action being identified in the request;
wherein the request included in the message conforms to the format "hyperaction://<Application Action>#<Payload>"

wherein "hyperaction" identifies a hyperaction protocol, "Application Action" identifies the function of the application program, and "Payload" comprises one or more data identifiers that specify data for use by the application program in carrying out the function;

wherein the function of the application program to invoke is based on the program action identified in the request and is determined at the separate client;

wherein the request in the message requests the application program to carry out the function using a label for the function that is meaningful to the application program;

sending result information from the application program to the separate client as a result of the application program carrying out the requested function;

wherein the result information is for use at the separate client.

30. A computer-readable storage medium as recited in claim 29, wherein the one or more sequences of instructions further comprise instructions the execution of which by the one or more processors causes the one or more processors to perform the steps of:

sending function information from the application program to the separate client that describes available functions of the application program;

wherein the sending is for registering the function information in association with one or more function identifiers in an action list that is stored at the client in association with a browser; and determining the function of the application program to invoke based on the program action identified in the request.

31. A computer-readable storage medium as recited in claim 29, wherein the program function is selected from one of a plurality of available hyperaction functions that are defined within the application program.

32. A system comprising:

a server executed by one or more processors;

a client operable to communicative connect to the server wherein the client is executed by a second one or more processors;

an application program associated with the server;

a set of one or more hyperaction programs that are associated with the application program available for being called by the client; and a mechanism for registering the hyperaction programs within the client, wherein the mechanism is associated with the application program, and wherein the registering creates a mapping between the hyperaction programs and an action list residing at the client; and wherein the client is operable to send, and the application program is operable to receive, a message including a request to invoke a hyperaction program from the set of one or more hyperaction programs, wherein the request substantially conforms to the format "hyperaction://<Application Action>#<Payload>"

wherein "hyperaction" identifies a hyperaction protocol, "Application Action" identifies the hyperaction program associated with the application program, and "Payload" comprises one or more data identifiers that specify data for use by the application program in carrying out the hyperaction program.

\* \* \* \* \*

UNITED STATES PATENT AND TRADEMARK OFFICE
CERTIFICATE OF CORRECTION

PATENT NO. : 7,409,672 B1  Page 1 of 1
APPLICATION NO. : 10/884433
DATED : August 5, 2008
INVENTOR(S) : Krishnam R. Datla It is certified that error appears in the above-identified patent and that said Letters Patent is hereby corrected as shown below:

In column 16, line 24, in claim 32, delete "substantially".

Signed and Sealed this

Twelfth Day of October, 2010

David J. Kappos
*Director of the United States Patent and Trademark Office*